(No Model.)
B. THOENS.
MACHINE FOR MAKING CANDY.
No. 498,142. Patented May 23, 1893.
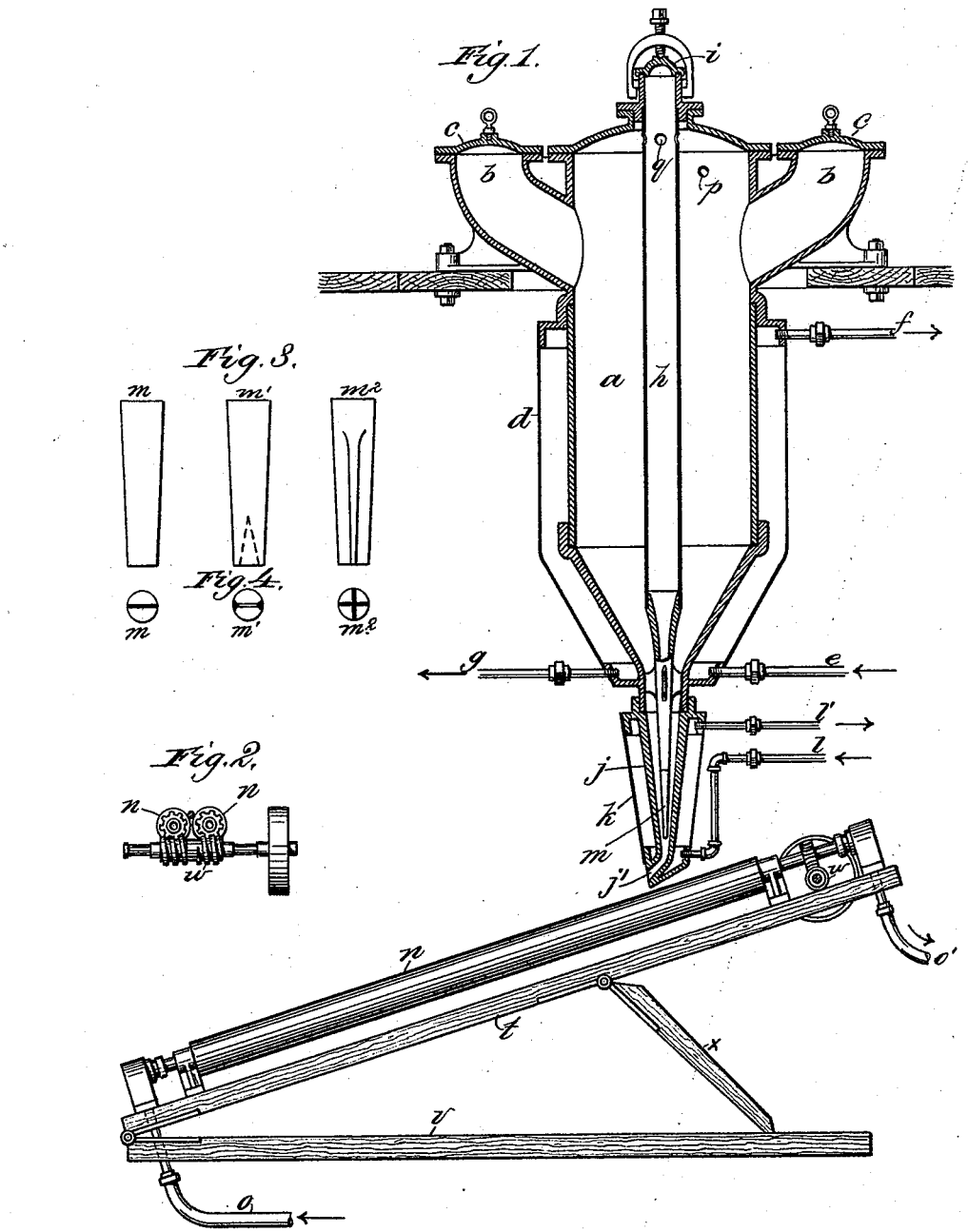
WITNESSES:
G. W. Rea,
Robert Everett
INVENTOR
Burchard Thoens,
By James L. Norris,
ATTORNEY

UNITED STATES PATENT OFFICE.

BURCHARD THOENS, OF NEW ORLEANS, LOUISIANA.

MACHINE FOR MAKING CANDY.

SPECIFICATION forming part of Letters Patent No. 498,142, dated May 23, 1893.

Application filed January 31, 1893. Serial No. 460,386. (No model.)

*To all whom it may concern:*

Be it known that I, BURCHARD THOENS, a subject of the Emperor of Germany, residing at New Orleans, in the parish of Orleans and State of Louisiana, have invented new and useful Improvements in Machines for Making Candy, of which the following is a specification.

The object of my invention is to stripe, cool and twist stick candy of the kind made by a machine patented by me August 2, 1892, No. 480,149.

To enable others skilled in the art to which my invention pertains to fully understand and to make, construct and use the same, I will now describe said invention in detail, reference being made for this purpose to the accompanying drawings, in which—

Figure 1, is a section taken in the axial line of a main containing vessel, the rollers arranged beneath the same being shown in elevation. Fig. 2, is a detail end view of the rollers shown in Fig. 1, illustrating one means of driving said rolls in the same direction. Fig. 3, is a detail view of three different forms of mouth-pieces used upon the separate vessel. Fig. 4, is an end elevation of the parts shown in Fig. 3.

Referring to the said drawings, the reference letter $a$ indicates a closed main vessel provided with one or more charging openings $b$, having removable covers $c$, said vessel being surrounded by a steam-jacket $d$ with steam-inlet $e$, steam-outlet $f$ and condensed water-outlet $g$. An internal tube, or separate vessel $h$, with removable cover $i$ projects down into a conical pipe $j$ having a suitable exit-terminal $j'$, said conical pipe and terminal surrounded by a jacket $k$ provided with inlet and outlet pipes $l\, l'$, for hot water. The smallest part of the pipe $j$ is equal to the size of candy to be made.

To the lower end of the internal tube or separate vessel $h$, is attached a mouth-piece $m$, of which three are shown in Figs. 3 and 4 upon an enlarged scale, viz., $m$, $m'$, and $m^2$.

The whole machine or apparatus just described is supported over two hollow rollers $n$, with hollow shafts, through which cooling water passes by means of inlet and outlet-pipes $o\, o'$. These rollers are slowly revolved simultaneously and in the same direction, either by means of a worm-gear $w$, as shown in Figs. 1 and 2, or other suitable means. The rotary motion of the hollow rollers causes the candy to move longitudinally thereof and in order to give the candy a downward motion, the rollers are inclined, whereby the candy constantly tends to glide downward by its own weight.

The operation of my machine is as follows: Prepared candy-material, of desired consistency, is put into vessel $a$ by the charging-opening, or openings $b$. Candy-material differing in color, or other quality, is also introduced into the internal pipe or separate vessel $h$. Compressed air is then introduced into the vessel $a$ through an opening $p$. The same air-pressure also acts on the candy-material in the internal tube or separate vessel $h$, openings $q$ being provided therein for this purpose. This air-pressure forces the candy-material out of the conical pipe $j$ and at the same time out of the mouth-piece $m$, and both emerge together through the exit-terminal $j'$, and pass into the gap formed between the two rollers $n$ which, being revolved in the same direction, twist or turn the candy stick, and as it glides along, becomes cooled and hard by being in contact with the cooled surfaces of these rollers. The finished candy, striped and twisted, may then be carried by suitable carriers or conveyers to be cut in length and wrapped.

The use of the hollow cooled rollers has the following advantages: If the jacket $k$, surrounding the conical pipe $j$, happens to be cooled too much, the candy would become too cool and would either require a very great pressure to be forced out, or it would only come very slowly. By using hot water in this jacket, it issues more rapidly but is softer, and would readily flatten, if it were placed on an ordinary carrier. But when slowly revolved, it will keep its cylindrical shape until cooled. It is obvious that if the conical pipe $j$ had more than one outlet-opening, more than two rollers would be used, and if more than one color would be required, more than one internal pipe or tube $h$ could be used, or the same tube could be subdivided.

The mouth-pieces $m$, $m'$, and $m^2$ are samples of a variety that may be used.

It is obvious that the interior vessel $h$ may be arranged upon the interior of the vessel $a$, and that I may use more than one of said vessels *h*, provided the plurality of mouth-pieces *m* shall have the same arrangement, in relation to the conical pipe *j*, that the single mouth-piece has, or substantially so. Should the vessel *h* be arranged outside the vessel *a*, it would be necessary to extend its mouth-piece *m* through the wall of the vessel *a*, or through the wall of the conical pipe *j*, and curved, or turned into proper position. With an exterior vessel *h*, an air-pressure common to both vessels could be obtained from a single source by simply connecting the upper portions of said vessels by a suitable pipe.

For convenience, I mount the rollers *n* upon a support *t* hinged to a base *v*, and having a brace *x*, which is capable of adjustment to give varying inclination to the said rollers.

Having thus described my invention, I claim—

1. In a candy machine, the combination with a main vessel, having at its lower end a discharge nozzle, heating jackets surrounding the main vessel and its nozzle, pipes for conducting heating fluid into and out of the said jackets, inclined hollow cooling rollers arranged beneath the discharge nozzle and rotating in the same direction, and means for supplying a cooling fluid to the interior of the hollow cooling rollers, substantially as described.

2. In a candy machine, the combination with a main vessel, having at its lower end a discharge nozzle, of a separate vessel located in the main vessel for containing material differing in color or other quality from that in the main vessel, and having a mouth piece arranged within and discharging through the discharge nozzle of said main vessel, inclined hollow cooling rollers arranged between the discharge nozzle of the main vessel and rotating in the same direction, and means for supplying a cooling fluid to the interior of the hollow cooling rollers, substantially as described.

3. In a candy machine, the combination of a main vessel, having at its lower end a discharge nozzle, heating jackets surrounding the main vessel and its nozzle, pipes for conducting heating fluid into and out of said jackets, a separate vessel arranged within the main vessel for containing material differing in color or other quality from that in said main vessel, and having a mouth piece arranged within and discharging through the discharge nozzle of the main vessel, inclined hollow cooling rollers arranged beneath the discharge nozzle of the main vessel and rotating in the same direction, and means for supplying a cooling fluid to the interior of the hollow cooling rollers, substantially as described.

4. In a candy machine, the combination of a main vessel, having at its lower end a discharge nozzle, inclined hollow cooling rollers arranged beneath the discharge nozzle and rotating in the same direction, and means for supplying a cooling fluid to the interior of the hollow cooling rollers while they are rotating, substantially as described.

In testimony whereof I have hereunto set my hand and affixed my seal in presence of two subscribing witnesses.

BURCHARD THOENS. [L. S.]

Witnesses:
E. P. CHAUDET,
E. J. BARNETT.